United States Patent [19]

Ratliffe

[11] 4,364,170
[45] Dec. 21, 1982

[54] BALL BEARING ASSEMBLY DEVICE

[75] Inventor: Joseph M. Ratliffe, Fredericksburg, Va.

[73] Assignee: The United States of America as represented by the Secretary of the Navy, Washington, D.C.

[21] Appl. No.: 224,775

[22] Filed: Jan. 13, 1981

[51] Int. Cl.³ .................................................. B23P 19/04
[52] U.S. Cl. .................................. 29/724; 29/148.4 B; 29/281.1; 29/DIG. 44
[58] Field of Search .......... 29/724, 148.4 B, 148.4 R, 29/149.5 R, 281.1, DIG. 44

[56] References Cited

U.S. PATENT DOCUMENTS

| | | | |
|---|---|---|---|
| 1,758,653 | 5/1930 | Cramer | 29/724 |
| 2,844,865 | 7/1958 | Cook et al. | 29/724 |
| 3,025,590 | 3/1962 | Litz | 29/148.4 |
| 3,103,059 | 9/1963 | Rozentals | 29/724 |
| 3,116,543 | 1/1964 | Schoos | 29/724 |
| 3,401,440 | 9/1968 | Sutowski | 29/724 |
| 3,842,472 | 10/1974 | Rottacker et al. | 29/724 |

*Primary Examiner*—Daniel C. Crane
*Attorney, Agent, or Firm*—R. S. Sciascia; A. L. Branning; W. R. Henderson

[57] ABSTRACT

A ball bearing assembly device for permitting dry assembly of bearings without additional equipment. The assembly device is provided with an inner body surrounded by an outer body so as to create a circumferential gap therebetween. The gap is provided with a vacuum connection which allows positioning of ball bearings on a ball bearing shaft or inner bearing ring when the shaft or ring is mounted on the inner body. The bearing shaft is placed into the inner body so as to provide a mounting to aid in insertion of the bearing shaft or ring into the outer bearing ring. The bearing shaft may be mounted on a reciprocating shaft for insertion into the outer bearing ring.

18 Claims, 3 Drawing Figures

4,364,170

BALL BEARING ASSEMBLY DEVICE

BACKGROUND OF THE INVENTION

The present invention relates to a ball bearing assembly device and more particularly to a device for assembling bearings without the aid of oil or additional aligning equipment.

Prior art bearing assembly devices have included methods which require the holding of the ball bearings in the ball bearing rings by means of oil placed on the ball bearings. The disadvantage of this method and these devices are that they preclude testing of the bearings for friction measurements in a dry state. These methods also prevent testing of the bearing with different types and quantities of lubricants.

Other prior art devices include that disclosed in U.S. Pat. No. 3,025,590, to Litz. The patent to Litz discloses a device for assembly of a ball bearing by drawing air suction through a quantity of roller elements to position them against apertures shaped and positioned to locate the roller elements in the required position. Once the roller elements are positioned the inner and outer bearing rings may be positioned relative to the roller bearings. The device disclosed by Litz fails to teach a bearing assembly device which allows positioning of the ball bearings on the bearing shaft during assembly of the bearing.

SUMMARY OF THE INVENTION

Accordingly, there is provided in the present invention a ball bearing assembly device which permits assembly of the ball bearings on the bearing shaft without the use of oil or additional alignment means. The assembly device also provides for alignment of and insertion of the ball bearing shaft into the inner bearing ring.

The assembly device is constructed with a cylindrical inner body surrounded by a hollow outer body. A circumferential gap is created between the inner and outer bodies. The inner body is provided with a through cavity in which is positioned a mounting shaft which can reciprocate in the inner body. The mounting shaft is furnished at one end with a threaded connection. An inner bearing ring or bearing shaft is mounted on the threaded connection of the mounting shaft by means of a tapered fastener.

The circumferential gap between the inner body and the outer body is provided with a vacuum connection. The vacuum drawn by the vacuum connection through the circumferential gap affixes the ball bearings to the bearing shaft after the ball bearings are furnished to the bearing shaft.

The outer body is provided with a circumferential inwardly extending lip adjacent to the bearing shaft which initially positions the ball bearings on the shaft. The assembly device may also be provided with a funnel which surrounds the inner body and is mounted on the outer body so as to furnish the ball bearings to the bearing shaft.

The mounting shaft of the assembly device may also be provided with an elastic member which allows the return of the mounting shaft to the original position after insertion of the bearing shaft and ball bearings into the bearing ring.

OBJECTS OF THE INVENTION

It is an object of the present invention to provide a ball bearing assembly device which permits assembly of ball bearings without the aid of lubricants or additional alignment means.

It is another object of the invention to provide a bearing assembly device which permits assembly of the bearings with minimal time and effort.

A further object of the invention is to provide a bearing assembly device which permits alignment of the inner bearing ring with the outer bearing ring.

It is a still further object of the invention to provide a bearing assembly device which permits assembly of the bearing and prevents lodging of the ball bearings in the device.

A still further object of the invention is to provide an assembly device which permits bearing assembly without individually furnishing the ball bearings to the assembly device.

Other objects, advantages, and novel features of the present invention will become apparent from the following detailed description of the invention when considered in conjunction with the drawings.

BRIEF DESCRIPTION OF THE DRAWINGS

A more complete appreciation of the invention and many of the attendant advantages thereof will be readily understood by reference to the following detailed description when considered with the accompanying drawings in which like reference numerals designate like parts throughout the figures and wherein.

DESCRIPTION OF THE PREFERRED EMBODIMENT

Figure 1:
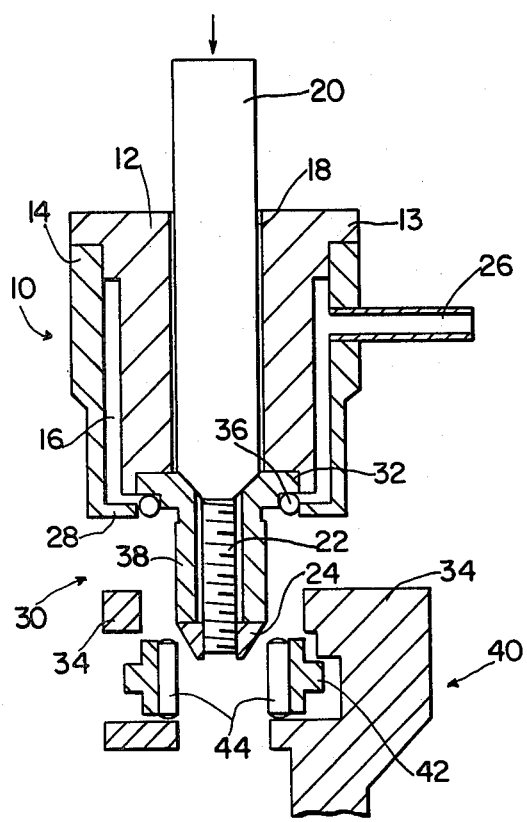
FIG. 1 shows a schematic cross section of the ball bearing assembly device of the present invention.

Referring to FIG. 1, there is illustrated a cross section of ball bearing assembly device 10 of the subject invention. The assembly device is shown in the process of assembling a ball bearing in a gimbal assembly.

Assembly device 10 is constructed with a cylindrical inner body 12 which is surrounded along its cylindrical surface by hollow outer body 14. The inner body 12 is provided with a double stepped portion 13 at one end thereof against which is seated outer body 14 so as to create a circumferential gap 16 between the inner body and the outer body.

As illustrated in FIG. 1 the gap is connected to a vacuum connection 26 which draws vacuum in circumferential gap 16. The outer body is provided with a circumferential radially inward extending lip 28 which extends gap 16 inwardly toward the inner body.

The inner body is provided with a cylindrical through cavity 18 in which is positioned mounting shaft 20 for reciprocating motion. The mounting shaft cooperates with inner body 12 to provide a holding means for the mounting of an inner bearing ring. It is to be understood that shaft 20 and inner body 12 can be of integral construction and that inner body 12, outer body 14 and circumferential gap 16, although disclosed as cylindrical, can be of any suitable shape.

As illustrated in FIG. 1, mounting shaft 20 is provided with a threaded portion 22 on the end adjacent to circumferential lip 28. Threaded portion 22 is used in cooperation with tapered fastener 24 to secure bearing shaft or ring 32 to mounting shaft 20. Tapered fastener 24 functions as an alignment means for insertion of inner bearing ring or bearing shaft 32 into outer bearing ring 34.

It can be seen from FIG. 1, that inner bearing shaft 32 is positioned on the inner body so as to be adjacent to lip 28 which serves as a positioning means for ball bearings 36. Ball bearings 36 are positioned by lip 28 in proximity to circumferential gap 16.

After the ball bearings are positioned on bearing shaft 32 a vacuum is drawn on gap 16 by means of vacuum connection 26. The vacuum provided to gap 16 affixes the ball bearings in place on bearing shaft 32. The assembly device may then be inverted, as shown in FIG. 1, and positioned above the outer bearing ring, in this case a gimbal bearing assembly 40.

With the assembly device in the inverted position the inner shaft is aligned with the outer bearing ring by means of the tapered fastener 24. The assembly device is then lowered until lip 28 seats against the upper face of the outer bearing ring 34. In assembling the gimbal bearing shown, the bearing shaft 32 is also provided with a gimbal needle bearing surface 38 which functions as a roller bearing surface for the needle bearings 44 positioned in gimbal ring 42.

Figure 2:
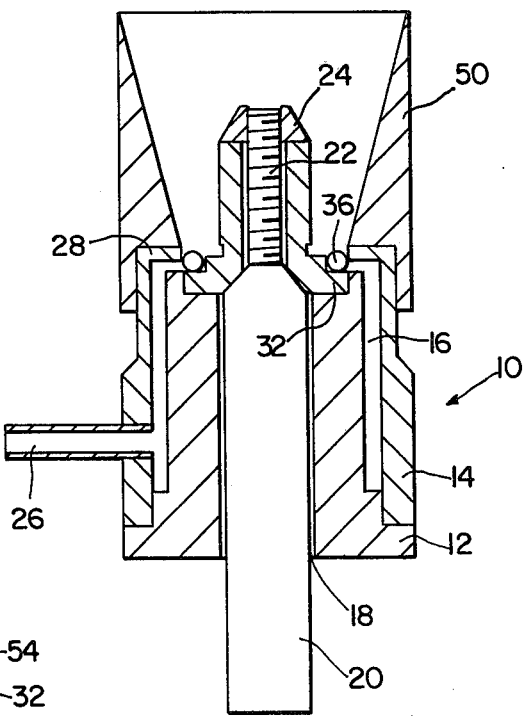
FIG. 2 shows a cross section of a modification of the assembly device of the present invention.

Referring to FIG. 2, there is illustrated a cross section of the bearing assembly device of FIG. 1. The assembly device is provided with a funnel attachment 50 which serves as a means for furnishing ball bearings to the device without the necessity of individually placing the ball bearings on inner shaft 32. By means of the funnel attachment ball bearings may be poured into the funnel, the vacuum provided by means of vacuum connection 26, and the excess ball bearings removed from the funnel after the desired number of ball bearings are affixed to the inner bearing shaft by the vacuum.

Figure 3:
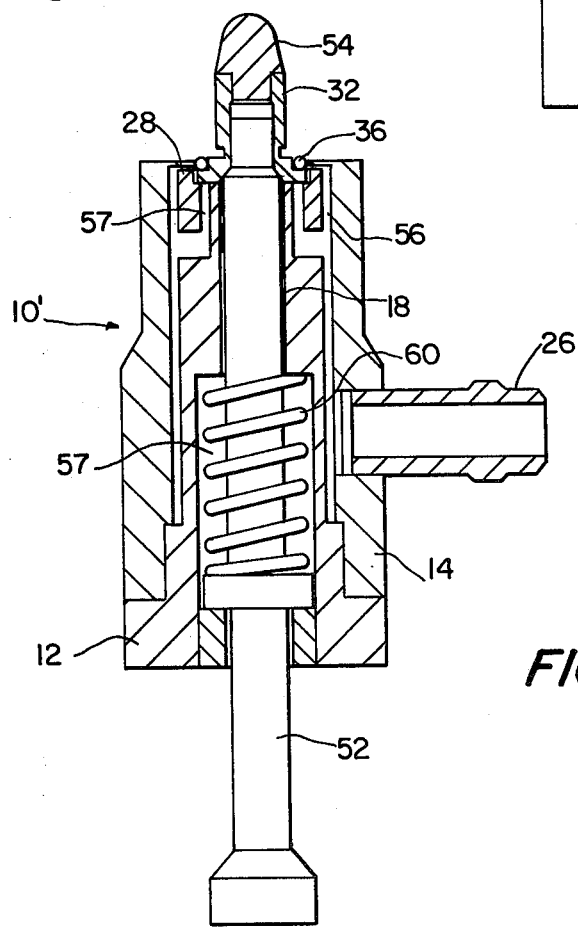
FIG. 3 illustrates a cross section of a further embodiment of the assembly device of the present invention.

A second embodiment of the ball bearing assembly device of the present invention is illustrated in FIG. 3. The assembly device 10' is provided with a gap 56 which functions to both affix a plurality of ball bearings 36 to inner bearing shaft 32 and also affixes inner bearing shaft 32 to the inner body. This dual function is accomplished by means of gap 56 and circumferential channels 57 which extend radially inward in the inner body and then axially outward in the proximity of inner bearing shaft 32 so as to supply a vacuum to affix bearing shaft 32 to inner body 12.

The embodiment of the invention illustrated in FIG. 3 is also provided with a means for returning the mounting shaft to the original position after insertion of the inner bearing shaft in the outer bearing ring. Inner body 12 is provided with a return spring cavity as an expanded portion of through cavity 18. A return spring 60 is mounted in cavity 57 so as to surround mounting shaft 52 and act as an elastic return means when mounting shaft 52 is moved axially to insert the inner bearing shaft in the outer bearing ring.

The assembly device shown in FIG. 3, is also provided with a tapered plug, which may be constructed of teflon or other suitable material, which functions to align the inner bearing shaft with the outer bearing ring in the same manner as tapered fastener 24, illustrated in FIG. 1.

In operation, the bearing assembly device of the present invention can be used to place ball bearings on an inner bearing shaft for the assembly of the inner bearing shaft in an outer bearing ring. The assembly operation can be accomplished with minimal time and effort due to the alignment function provided by tapered fastener 24 or plug 54. In addition circumferential lip 28 can be seated against the outer bearing ring which prevents the ball bearings from being lodged between the assembly device and the outer bearing ring during assembly of the bearing. Further, the ball bearings do not have to be loaded individually into the assembly device due to the furnishing function provided by the funnel attachment.

It is thus apparent that the disclosed bearing assembly device provides a means for assembling a ball bearing without the aid of lubricants to position the ball bearings on the inner bearing ring or the assistance of additional alignment means. The disclosed bearing assembly device reduces the effort and time required to assemble the bearings by automatically aligning the bearing components and preventing lodging of the ball bearings between the device and the components by seating the assembly device on the outer bearing ring.

Many obvious modifications and embodiments of the specific invention other than those set forth above will readily come to mind to one skilled in the art having the benefit of the teachings presented in the foregoing description and the accompanying drawings of the subject invention and hence it is to be understood that such modifications are included within the scope of the appended claims.

What is claimed as new and desired to be secured by Letters Patent of the United States is:

1. A device for assembling an inner bearing ring into an outer bearing ring, comprising:
   means holding the inner bearing ring for assembly into the outer bearing ring;
   means attaching the inner bearing ring to said holding means including a threaded portion on said holding means adapted to extend through the inner bearing ring and a fastener associated with said threaded portion for securing the inner bearing ring to said holding means;
   means positioning a plurality of ball bearings relative to the inner bearing ring;
   means aligning the inner bearing ring with the outer bearing ring for insertion thereinto; and
   vacuum means affixing temporarily the plurality of ball bearings relative to the inner bearing ring.

2. A device as in claim 1 further comprising means inserting the inner bearing ring into the outer bearing ring.

3. A device as in claim 1 further comprising means furnishing the plurality of ball bearings to the positioning means.

4. A device as in claim 1 wherein the holding means comprises:
   an inner body; and
   an outer body surrounding the inner body, said inner bearing ring being positioned between the inner and outer bodies and attached to said inner body, said holding means, with the inner bearing ring attached, positioned for insertion of the inner bearing ring into the outer bearing ring.

5. A device as in claim 4 wherein the affixing means are vacuum means comprising:
   a gap means between the inner body and the outer body; and
   a vacuum connection to the gap means;
   said plurality of ball bearings being furnished to the gap means and affixed thereto.

6. A device for assembling an inner bearing shaft into an outer bearing ring, comprising:

means holding the inner bearing shaft for assembly into the outer bearing ring;

means attaching the inner bearing shaft to said holding means including a threaded portion on said holding means adapted to extend through the inner bearing shaft and a fastener associated with said threaded portion for securing the inner bearing shaft to said holding means;

means positioning a plurality of ball bearings relative to the bearing shaft;

means aligning the bearing shaft with the bearing ring, and vacuum means affixing the plurality of ball bearings to the bearing shaft.

7. A device as in claim 6 further comprising means inserting the bearing shaft into the bearing ring.

8. A device as in claim 6 wherein the means holding the bearing shaft comprise:

an inner body; and an outer body surrounding the inner body, said bearing shaft being positioned between the inner and outer bodies and attached to said inner body, said holding means, with the inner bearing shaft attached, positioned for insertion of the inner bearing shaft into the outer bearing ring.

9. A device as in claim 8 wherein the inner body is hollow and a mounting shaft is slidingly positioned in the inner body, said bearing shaft being removably mounted on the mounting shaft by mounting means.

10. A device as in claim 8 wherein the outer body comprises the means positioning a plurality of ball bearings relative to the bearing shaft.

11. A device as in claim 6 wherein the means holding the bearing shaft comprise:

an inner body; and an outer body surrounding the inner body, said bearing shaft being positioned between the inner and outer bodies and attached to said inner body, said holding means, with the inner bearing shaft attached positioned for insertion of the inner bearing shaft into the outer bearing ring.

12. A device as in claim 11 wherein the means affixing the plurality of ball bearings to the bearing shaft comprises vacuum means, comprising:

a gap means formed between the inner body and the outer body; and a vacuum connection to the gap means;

said plurality of ball bearings being furnished to the gap means and affixed thereto.

13. A device as in claim 9 wherein the mounting means comprises a threaded portion of the mounting shaft and a threaded fastener, said threaded fastener being tapered to align the bearing shaft for insertion into the bearing ring.

14. A device as in claim 6 wherein the means aligning the bearing shaft with the bearing ring comprise a shaped portion of the holding means.

15. A device as in claim 7 wherein the means inserting the bearing shaft into the bearing ring comprise a mounting shaft positioned in the holding means for reciprocating motion, said bearing shaft being mounted on the mounting shaft.

16. A device as in claim 9 wherein the mounting shaft is provided with an elastic means for returning the mounting shaft after insertion of the bearing shaft in the bearing ring.

17. A device as in claim 12 wherein the affixing means also attach the bearing shaft to the mounting shaft and wherein a plug is positioned in the bearing shaft, said plug being shaped to align the bearing shaft for insertion into the bearing ring.

18. A device for assembling an inner bearing shaft into an outer bearing ring, comprising:

means holding the inner bearing shaft for assembly into the outer bearing ring, said holding means comprising:

an inner body;

a hollow outer body surrounding the inner body and having means for positioning said bearing shaft between the inner body and outer body and for attaching said bearing shaft to said inner body, and means for positioning said holding means, with the inner bearing shaft attached for insertion of the inner bearing shaft into the outer bearing ring; and means attaching the bearing shaft to the holding means, said attaching means including a threaded portion on said holding means adapted to extend through the inner bearing ring and a fastener associated with said threaded portion for securing the inner bearing ring to said holding means;

means positioning a plurality of ball bearings relative to the bearing shaft, said positioning means being the outer body; and means affixing temporarily the plurality of ball bearings relative to the inner bearing shaft, said affixing means comprising:

a gap means between the inner body and the outer body; and a vacuum connection to the gap.

* * * * *